Nov. 4, 1952  D. A. BARRY ET AL  2,616,128
METHOD AND APPARATUS FOR EXTRUDING TUBES
FROM THERMOPLASTIC COMPOSITIONS
Filed Sept. 21, 1950
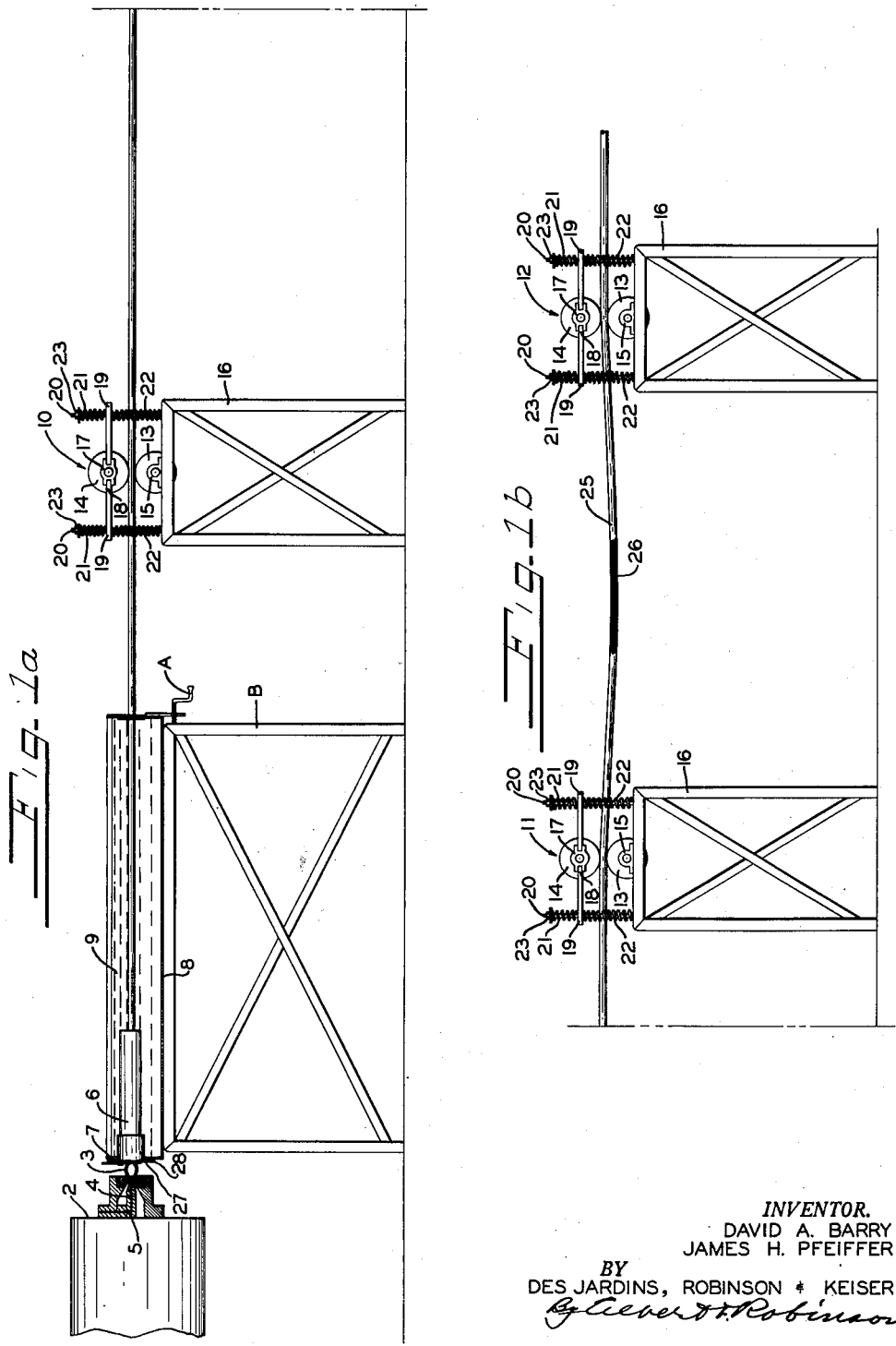
*INVENTOR.*
DAVID A. BARRY
JAMES H. PFEIFFER
BY
DES JARDINS, ROBINSON & KEISER
THEIR ATTORNEYS Patented Nov. 4, 1952

2,616,128

UNITED STATES PATENT OFFICE 2,616,128

METHOD AND APPARATUS FOR EXTRUDING TUBES FROM THERMOPLASTIC COMPOSITIONS

David A. Barry and James H. Pfeiffer, New Brunswick, N. J., assignors to Nixon Nitration Works, Nixon, N. J., a corporation of New Jersey Application September 21, 1950, Serial No. 185,934

12 Claims. (Cl. 18—14)

This invention relates to a method and apparatus for extruding tubes from thermoplastic compositions, and it particularly pertains to a liquid means for sealing within an extruded tube air that is contained therein to hold the tube walls expanded against collapsing while it is being subjected to cooling means until such tube has cooled sufficiently to be self-sustaining.

In the method heretofore used, a floating plug, including a magnetizable core, has been placed within the extruded tube to provide an air seal, the floating plug being held in place by a solenoid of annular cross section having a central opening through which the tube, with the floating plug therein, is passed. The floating plug provides a seal to retain the air within the tube until it is sufficiently cooled to be self-sustaining. The plug is of solid material and is made of a size to fit the cross section of the tube bore. Some means has to be provided for holding the plug in position within the bore of the tube. The state of the art is typified by Slaughter 2,377,908 issued June 12, 1945, and 2,491,589, issued December 20, 1949, and over which the present invention is an improvement.

Accordingly, the principal object of our invention is to provide an extrusion apparatus and method in which the air seal for the extruded tube is very simple but is positive and effective in its operation.

Another object of our invention is to provide an extrusion apparatus and method in which the air seal is held in place by gravity.

Another object of the invention is to provide an extrusion apparatus and method in which the weight of the seal is in proportion to the air pressure within the tube.

A still further object of the invention is to provide an air seal whose weight can be easily regulated by the extruded tube.

Further objects, and objects relating to details of construction and economies of operation will readily appear from the detailed description to follow. In one instance we have accomplished the objects of our invention by the device and means set forth in the following specification. Our invention is clearly defined and pointed out in the appended claims. A structure constituting a preferred embodiment for carrying the method of our invention is illustrated in the accompanying drawings forming a part of the specification, in which:

Fig. 1a is a side elevation of the left hand end of an apparatus embodying the invention and carrying out the method thereof.

Fig. 1b is a side elevation of the right hand end of the apparatus shown in Fig. 1a.

Our invention, generally described, comprises extruding a tube from a mass of thermoplastic composition while it is in a moldable condition. The extruded tube is fed through a finish dye, immersed in water, and while being so finished and cooled is filled with air that is sealed therein to retain the tube in expanded condition until it has sufficiently cooled to be self-sustaining. The extruded tube is drawn between rolls which slightly compress it sufficiently to be drawn through the finish die to which it is fed from the end of a conventional tube forming extruder. A portion of the tube is bent to receive a liquid, particularly a heavy liquid such as mercury, to form an air seal for the air which is contained within the tube for keeping it expanded until being cooled sufficiently to be self-sustaining. The weight of the liquid and the portion of the tube to be bent are utilized to bend a portion of the tube, and this weight of the liquid seal may be in proportion to the air pressure that is to be maintained within the tube. The formed tube, beyond its sealed end can be cut into desired length.

Referring specifically to the drawings in which like numerals are used to designate like parts, numeral 2 is the discharge end of a conventional extruder through which thermoplastic moldable composition material is fed for being formed into a tube 3. Air is ejected to the interior of the tube through an air nozzle 4 formed in the core 5 of the extruder.

The extruded tube 3 is fed from the extruder to a finish die 6 that is fixed to the wall 7 of a tank 8 containing water 9 in which the finish die is immersed. The entire tube is subjected to the water coolant while still quite hot to prevent shrinkage and warpage from the cross-sectional shape in which it has been formed. The tubing must also be hard enough to hold its shape as it is drawn through the finish die but yet plastic enough so that it can be smoothed by the finish die.

An adjusting crank A may be provided on any part of the water tank to facilitate moving to or away from the extruder, thereby regulating the size of the tube as it enters the finish die 6. The end of the crank abuts against the end of a table B on which the tank is mounted in horizontal alignment with the draw rollers and the extruder.

The extruded tube is drawn to and through the finish die by a plurality of pressure roll pairs 10, 11 and 12. Three roll pairs are shown, each comprising a pair of rolls 13 and 14. Roll 13 is journaled in a pair of bearings 15 (one shown), fixed to the top of the support 16. The other roll 14 is journaled in bearings 17 supported on bars 18 whose opposite ends 19 are reciprocably attached to vertical rods 20. The ends of the bars 18 are resiliently positioned by opposing springs 21 and 22 surrounding the vertical rods 20. The tension of the roll 14 can be regulated by the nuts 23 on the ends of rods 20.

Two roll pairs 11 and 12 are horizontally spaced to permit the intervening portion 25 of the tube to bend or dip downwardly. A heavy liquid 26, such as mercury, is placed within the dip or bent portion of the tube to close a cross section and provide an air seal for the air contained within the tube. The weight of the liquid will also cause the intermediate portion of the tube 25 to dip. The air pressure within the tube is relatively low, being merely sufficient to hold the tube expanded and prevent it from collapsing until cooled enough to be self-sustaining. Ordinarily the air pressure would be about four (4) ounces per square inch, but this would vary in accordance with the size of the tube, the thickness of the wall and the material from which the tube is extruded. The liquid 26 is held in place within the dip or bent portion by gravity, and the air pressure within the tube can be readily adjusted either by the extent of the dip, the quantity of the liquid contained therein, or both. Accordingly, this pressure of the air can be quickly regulated by increasing or decreasing the steepness of the dip or by increasing or decreasing the quantity of liquid contained within the dip.

While mercury is preferred as the liquid contained within the tube for the liquid seal because it is relatively heavy in weight, it will, of course, be understood that any suitable liquid may be used. A larger quantity of a lighter weight liquid would be required for the equal weight of a smaller quantity of mercury. The invention is in the method and apparatus in which a liquid is used and positioned by gravity for sealing the end of the tube rather than to the use of any particular liquid therefor.

The tubes may be formed from any suitable thermoplastic material such as cellulose derivatives, particularly cellulose acetate and cellulose acetate butyrate, polymerized vinyl materials, and other such resin compositions that are commonly extruded in continuous lengths.

Any finish die, through which the extruded tubing is drawn from the extruder, may be used as this invention is not limited to any particular finish die or even with a finish die, but is adapted for sealing the extruded tube where no finish die is used. The preferred finish die, if one is used, is that which is the subject of our application Serial No. 185,933, filed September 21, 1950.

That finish die comprises a tubular casing having a flange plate 27 attached to one end for being bolted to the wall 7 of the tank. This plate 27 is sweated to the end of the tubular casing as is the reenforcing collar 28 which surrounds the end of the casing, or it may be bolted to the collar.

We are aware that there may be various changes in details of construction of the apparatus without departing from the spirit of our invention and therefore, we claim our invention broadly as indicated by the appended claims.

Having thus described our invention what we claim as new and useful and desire to secure by United States Letters Patent, is:

1. A method of forming a tube from a mass of moldable thermoplastic composition comprising extruding a mass of plastic material in tubular form, supporting a portion of the tube between rolls sufficiently spaced-apart for said portion of the tube therebetween to be bent downwardly by its own weight, placing a liquid in the bent portion of the tube to air-seal it, filling the tube with air, and regulating the air pressure within said tube by the weight of the liquid air-seal.

2. A method of forming a tube as set forth in claim 1 in which mercury is the liquid that is placed in the bent portion of the tube for air-sealing it.

3. A method of forming a tube from a mass of moldable thermoplastic composition comprising extruding a mass of thermoplastic material in tubular form, passing the extruded portion of the tube through a finishing die, supporting a portion of the tube between rolls sufficiently spaced-apart for said portion of the tube therebetween to be bent downwardly by its own weight, placing a liquid seal in the bent portion of the tube to air-seal it, filling the tube with air, and regulating the air pressure within said tube by the weight of the liquid air-seal.

4. A method of forming a tube as set forth in claim 3 in which the finishing die is immersed in water.

5. A method of forming a tube as set forth in claim 4 in which mercury is the liquid placed in the bent portion of the tube for air-sealing it.

6. A method of forming a tube from a mass of moldable thermoplastic composition comprising extruding a mass of thermoplastic material in tubular form, passing the extruded tube over supports which are horizontally spaced apart to permit the intervening part of the tube to dip, supporting the bent portion of the tube between spaced-apart driven rolls, placing a liquid in the dipped portion of the tube to provide an air-seal, filling the tube with air, and regulating the air pressure within said tube by the weight of the liquid air-seal.

7. A method of forming a tube from a mass of moldable thermoplastic composition as set forth in claim 6 in which mercury is the sealing liquid.

8. A method of forming a tube from a mass of moldable thermoplastic composition material as set forth in claim 7 in which the extruded tube is fed through a finishing die.

9. A method of forming a tube from a mass of moldable thermoplastic composition material as set forth in claim 8 in which the finishing die is immersed in water.

10. Apparatus for fabricating tubes from thermoplastic composition comprising means for extruding the tubing, means for cooling the tubing, means for supplying fluid pressure within the tubing for holding it expanded while being cooled, driven means sufficiently spaced-apart for supporting the portion of the tube therebetween and causing said tube portion to be bent downwardly by its own weight, and liquid means contained within the bent portion of the tubing for sealing it to maintain the fluid pressure therein, said spaced apart tube supporting means being utilized to regulate the extent of the downwardly bent portion of the tube.

11. Apparatus as set forth in claim 10 in which means for bending a portion of the tubing are spaced-apart supports over which the tubing is drawn.

12. Apparatus as set forth in claim 11 in which the liquid means contained within the bent portion of the tubing for sealing the air therein is mercury.

DAVID A. BARRY.
JAMES H. PFEIFFER.

REFERENCES CITED

The following references are of record in the file of this patent:

UNITED STATES PATENTS

| Number | Name | Date |
| --- | --- | --- |
| 2,423,260 | Slaughter | July 1, 1947 |
| 2,491,589 | Slaughter | Dec. 20, 1949 |
| 2,519,375 | Jargstorff et al. | Aug. 22, 1950 |